United States Patent
Dang

(10) Patent No.: US 8,102,786 B2
(45) Date of Patent: Jan. 24, 2012

(54) METHOD, SYSTEM AND APPARATUS FOR PROVIDING MODULATION AND CODING MODE USED BY MULTICAST SERVICE MACRO DIVERSITY

(75) Inventor: Shujun Dang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 759 days.

(21) Appl. No.: 11/742,977

(22) Filed: May 1, 2007

(65) Prior Publication Data

US 2007/0230351 A1     Oct. 4, 2007

Related U.S. Application Data

(63) Continuation-in-part of application No. PCT/CN2005/001817, filed on Nov. 1, 2005.

(30) Foreign Application Priority Data

Nov. 1, 2004 (CN) .......................... 2004 1 0094522

(51) Int. Cl.
*H04B 7/00* (2006.01)

(52) U.S. Cl. ........ 370/310; 370/208; 370/312; 370/328; 370/342; 370/343; 370/344; 370/345; 370/430

(58) Field of Classification Search .................. None
See application file for complete search history.

(56) References Cited

U.S. PATENT DOCUMENTS

| | | | | |
|---|---|---|---|---|
| 2004/0146041 A1* | 7/2004 | Lee et al. | ....................... | 370/349 |
| 2004/0152473 A1* | 8/2004 | Kuwano et al. | ............ | 455/456.2 |
| 2005/0117536 A1* | 6/2005 | Cho et al. | ....................... | 370/328 |
| 2006/0029011 A1* | 2/2006 | Etemad et al. | ................ | 370/311 |
| 2006/0239264 A1* | 10/2006 | Kang et al. | ..................... | 370/390 |
| 2007/0286066 A1* | 12/2007 | Zhang et al. | .................. | 370/208 |

FOREIGN PATENT DOCUMENTS

| | | |
|---|---|---|
| CN | 1476260 | 2/2004 |
| JP | 2002152124 A | 5/2002 |
| JP | 2003244067 A | 8/2003 |
| JP | 2004221760 A | 8/2004 |

(Continued)

OTHER PUBLICATIONS

Mandin et al. MBS (Multicast and Broadcast Service) enhanced for macro-diversity reception. IEEE 802.16 Broadband Wireless Access Working Group <http://ieee802.org/16>. Aug. 28, 2004.*

(Continued)

*Primary Examiner* — Ayaz Sheikh
*Assistant Examiner* — Peter Chau

(57) ABSTRACT

The invention discloses a method, a system and apparatus for providing modulation and coding mode used by multicast service macro diversity. In this method, a message containing relevant information of modulation and coding mode(s) used by an MBS zone is sent in the MBS zone at first; the MS receives the message, analyzes other messages in the MBS zone according to the relevant information of the modulation and coding mode(s) contained in this message, and receives MBS service data according to the analyzed result upon other messages in the MBS zone. The invention resolves the problem that an entity is required to uniformly manage the coding and modulation mode definition of each cell in the prior art, as well as the problem that the DCD count in the DL-MAP message has to be continuously tracked in the prior art.

28 Claims, 9 Drawing Sheets

FOREIGN PATENT DOCUMENTS

| KR | 2002-071111 | 9/2002 |
|----|-------------|--------|
| KR | 2003-008681 | 1/2003 |
| WO | 2004017580 A1 | 2/2006 |

OTHER PUBLICATIONS

Canadian Office Action for Application No. 2,582,591, dated Oct. 25, 2007.

International Preliminary Report on Patentability for International Application No. PCT/CN2005/001817, dated May 1, 2007.

International Search Report for International Application No. PCT/CN2005/001817, dated Jan. 5, 2006.

Written Opinion for International Application No. PCT/CN2005/001817, dated Jan. 5, 2006.

Dang, "The Enhancement to Marco Diversity in MBS Service," IEEE 802.16 Broadband Wireless Access Working Group (2004); <URL: http://ieee802.org/16>.

IEEE Standard for Local and Metropolitan Area Networks, 802.16™, "Part 16: Air Interface for Fixed Broadband Wireless Access Systems," IEEE Computer Society (2001).

Je Son, "[MBS Clarification—harmonized version]," IEEE 802.16 Broadband Wireless Access Working Group (2004), <URL: http://ieee802.org/16>.

European Search Report for Application No. 05806929.5-2412, dated Nov. 15, 2007.

Office action issued in corresponding Japanese patent application No. JP2007538247, Nov. 16, 2010, 8 pages.

IEEE P802.16e/D5: Part 16: Air Interface for Fixed and Mobile Broadband Wireless Access Systems, Sep. 18, 2004, total 376 pages.

IEEE P802.16 Broadband Wireless Access Working Group: "MBS Harmonization", Aug. 30, 2004, total 11 pages.

Written opinion issued in corresponding PCT Application No. PCT/CN2005/001817, Dec. 12, 2005, total 3 pages.

Office action issued in corresponding Japanese patent application No. 2007538247, Jul. 13, 2010, and English translation thereof, total 13 pages.

* cited by examiner

METHOD, SYSTEM AND APPARATUS FOR PROVIDING MODULATION AND CODING MODE USED BY MULTICAST SERVICE MACRO DIVERSITY

CROSS-REFERENCE TO RELATED APPLICATIONS

This is a continuation-in-part of International Application No. PCT/CN2005//001817, filed Nov. 1, 2005, which claims the benefit of Chinese Patent Application No. 200410094522.9, filed Nov. 1, 2004, the entire respective disclosures of which are hereby incorporated herein by reference.

BACKGROUND OF THE INVENTION

1. Field of the Technology

The invention relates to multicast service macro diversity techniques, more particularly to a method, a system and apparatus for providing modulation and coding mode used by multicast service macro diversity.

2. Field of the Invention

With the rapid development of the Internet, a lot of multimedia services have emerged, some of which require the same data to reach multiple users at the same time, namely to be multicast, and such services may be video on demand, television on demand, video conference, online education, interactive games and so on.

3. Background of the Invention

Multicast is a technique that transfers data from one data source to multiple destinations, including multicast and broadcast. As to broadcast services, Cell Broadcast Service (CBS) in traditional mobile networks only allows transmitting low-bit-rate data to all users through the cell's shared broadcast channel, which belongs to message services. As to multicast services, there are IP multicast techniques in terms of the existing IP networks, but the mobile network has some characteristics different from those of IP network, such as network structure, function entities and wireless interfaces, so the current IP multicast techniques are not suitable for mobile networks. In addition, compared with common services, mobile multimedia services are of the characteristics such as large quantity of data, long time duration, delay sensitive and so on. Therefore, transmission using current techniques of broadcast services and multicast service are not suitable for data transmission of mobile multimedia services.

In order to effectively utilize wireless resources, the Third Generation Partnership Project (3GPP), which is a Wide Code Division Multiple Access/Global System for Mobile Communications (WCDMA/GSM) global standardization organization, provides Multimedia Broadcast/Multicast Service (MBMS), and on the other hand, Multicast and Broadcast Service (MBS) is introduced into the latest protocol IEEE802.16e/D5 of IEEE802.16. MBMS service and MBS service provide the specifications of multicast in the mobile networks, so that a mobile network can provide point to multipoint services, thereby network resources can be shared, utilization ratio of network resources, especially of the air interface, is increased. The newly provided MBMS and MBS service can realize multicast and broadcast of both low-bit-rate text messages and high-bit-rate multimedia services, and this is obviously the trend of future mobile traffic development.

The network structure of the MBS service in IEEE802.16 protocol is shown in FIG. 1. With reference to FIG. 1, a mobile network function entity, MBS server, is newly added to support MBS service, one function of MBS server is to act as entry of content providers, and another is to manage multicast data transmission of the Base Stations (BSs) belonging to the MBS server, as well as distribute multicast data to those BSs. In addition, function entities like Mobile Stations (MSs) and BSs need to be mended by adding MBS service-relevant functions.

The MBS service operation mainly includes following steps: obtaining MBS service list information, MBS service authentication and obtaining the key, and normally receiving the MBS service. Specifically, before normally receiving the MBS service, MS acquires information, such as MBS content list, from MBS server first, and then requests a BS to authenticate the received MBS service content; after successful authentication, the BS transmits MBS downlink service parameters and other information to the MS, the MS then requests the BS to return the MBS key. When receiving the downlink service parameters and MBS key, the MS can receive related Media Access Control Protocol Data Unit (MAC PDU) and begin to receive the MBS service normally.

As mentioned above, normally receiving MBS service mainly means receiving MBS service content with the received MBS downlink service parameters. In the current standard draft, MBS downlink service parameters mainly include MBS ZONE identifier and Multicast Connection ID (Multicast CID).

In order to support macro diversity, which can improve the receiving performance, MBS-MAP message is introduced into IEEE802.16e/D5, the latest edition of IEEE802.16, this message is transmitted in MBS ZONE and its Information Elements (IEs) are shown as table 1.

TABLE 1

| Syntax | Size | Notes |
|---|---|---|
| MBS-MAP_Message_Format( ) { | | |
|    Management Message Type = ? | 8 bits | |
|    Frame number | 24 bits | The frame number is identical to the frame number in the DL-MAP |
|    for (I = 0; i < n; i++) { | | |
|      Multicast CID | 12 bits | 12 LSB of CID for multicast |
|      Modulation and Coding mode (DIUC) | 4 bits | |
|         OFDMA Symbol offset | 8 bits | OFDMA symbol offset with respect to start of the MBS zone |
|         Subchannel offset | 6 bits | |
|         Power Offset (Boosting) | 3 bits | 000: normal (not boosted); 001: +6 dB; 010: −6 dB; 011: +9 dB; 100: +3 dB; 101: −3 dB; 110: −9 dB; 111: −12 dB; |
|         No. OFDMA Symbols | 7 bits | |

TABLE 1-continued

| Syntax | Size | Notes |
|---|---|---|
| No. Subchannels | 6 bits | |
| Repetition Coding Indication | 2 bits | 0b00 - No repetition coding<br>0b01 - Repetition coding of 2 used<br>0b10 - Repetition coding of 4 used<br>0b11 - Repetition coding of 6 used |
| Next MBS frame offset | 8 bits | The Next MBS frame offset value is lower 8 bits of the frame number in which the BS shall transmit the next MBS frame. |
| Next MBS OFDMA Symbol offset | 8 bits | The offset of the OFDMA symbol in which the next MBS zone starts, measured in OFDMA symbols from the beginning of the downlink frame in which the MBS-MAP is transmitted. |
| }<br>If !(byte boundary) {<br>  Padding Nibble<br>}<br>} | 4 bits | Padding to reach byte boundary. |

The MBS-MAP message is used to notify each Multicast CID in the MBS ZONE of the physical channel resources allocated for them, including modulation and coding mode(s) of the burst, which is (are) indicated by a Downlink Interval Usage Code (DIUC), power offset, which is indicated by Boosting, and position of the next MBS frame. Therefore, if it correctly detects the MBS-MAP message, an MS can obtain the expected burst corresponding to the multicast connection, and the modulation and coding mode(s) used on the burst, and the power offset etc, then determines the position of the next MBS frame in this multicast connection, thereby normally receives the data through the multicast connection.

In the MBS-MAP message, the IE of DIUC is a 4-bit identifier used to identify the modulation and coding mode(s) used by current burst, and each form of the 4-bit identifier represents one kind of modulation and coding mode, thus the 4-bit identifier is also called a DIUC index, i.e., an index of modulation and coding modes. This DIUC value is defined in the Downlink Channel Description (DCD) message which is periodically broadcast by the current cell. Any change of the DCD message is identified by the Configuration Change Count in the DCD message and traced by using DCD count in other related information. For instance, DCD count is used in a Downlink Map (DL-MAP) message to track changes of the DCD message.

In the cellular systems, users at the edge of a cell endure poor communication qualities due to their long distance to the BS. To overcome this defect, macro diversity is introduced into cellular systems; with macro diversity, a receiver can receive signals from surrounding base stations, and extract useful signals from the received signals, thereby avoiding poor communication quality due to receiving signals from the single BS.

In the current solution, it is the current cell DIUC definition that the MBS service uses. To support macro diversity, all the cells in a MBS ZONE must utilize the same DIUC definition, which means sending the same DCD message. To realize that, an entity is needed to uniformly manage the DIUC definition of each cell, namely the definition of the DCD message.

Moreover, when receiving the MBS service, a receiver needs to continuously track the DL-MAP message in order to track the change of the DCD count, so as to determine whether to receive a new DCD message or not, in spite of the receiver is in SLEEP state or IDLE state, which is obviously a waste of power.

SUMMARY OF THE INVENTION

In view of the above, embodiments of the invention provide a method, a system and apparatus for providing a modulation and coding mode used by multicast service macro diversity, so as to provide the modulation and coding mode used by multicast service macro diversity for the MBS service with less system cost.

Embodiments of the invention also provide a method, a system and apparatus for providing a modulation and coding mode used by multicast service macro diversity, so that the receiver needs not continuously track the DL-MAP message.

According to one aspect of the invention, a method for providing modulation and coding mode information used for multicast service macro diversity includes:

sending a message which contains relevant information of modulation and coding mode(s) indicated by a downlink interval usage code (DIUC) and used in a multicast and broadcast service (MBS) zone;

a mobile station (MS) receiving the message, analyzing other messages in the multicast and broadcast service (MBS) zone according to the DIUC-relevant information contained in the message, and receiving multicast and broadcast service (MBS) service data according to the analyzing result of the other messages in the multicast and broadcast service zone; and wherein said message is contained in the multicast and broadcast service (MBS) zone of a downlink frame.

According to another aspect of the invention, a method for providing modulation and coding mode information used by multicast service macro diversity includes:

sending in a downlink frame a message containing relevant information of a downlink interval usage code (DIUC) used by a downlink burst, a mobile station (MS) judging whether the message update information element (IE) carried in a received downlink frame is identical to a reserved message update information, if yes, the mobile station (MS) directly receiving other messages of a multicast and broadcast service (MBS) zone according to the reserved DIUC-relevant information, otherwise, the mobile station (MS) receiving the message which is sent in the above step and is related to the message update information element (IE) carried by the downlink frame, and analyzing other messages in the multicast and broadcast service zone according to the DIUC-relevant information comprised in this message;

the mobile station (MS) receiving MBS service data according to the analyzing result of other messages in the multicast and broadcast service zone;

wherein the information element (IE) indicating the update of said message is added into an MBS-MAP message.

According to another aspect of the invention, a method for providing modulation and coding mode information used for multicast service macro diversity includes:

sending a message which contains relevant information of modulation and coding mode(s) indicated by a downlink interval usage code (DIUC) and used in a multicast and broadcast service (MBS) zone;

wherein said message is contained in the multicast and broadcast service zone of a downlink frame.

According to another aspect of the invention, a method for providing modulation and coding mode used by multicast service macro diversity includes:

sending in a downlink frame a message containing relevant information of a downlink interval usage code (DIUC) used by a downlink burst, wherein an information element (IE) indicating the update of said message is added into an MBS-MAP message.

According to another aspect of the invention, a method of receiving MBS service data in a mobile station (MS) includes:

receiving in the multicast and broadcast service zone of a received downlink frame a message which contains relevant information of modulation and coding mode(s) indicated by a downlink interval usage code (DIUC) and used in a multicast and broadcast service (MBS) zone;

analyzing other messages in the multicast and broadcast service zone according to the DIUC-relevant information contained in the received message; and receiving the multicast and broadcast service data according to the analyzing result of said other messages in the multicast and broadcast service zone.

According to another aspect of the invention, a method of receiving MBS service data in a mobile station (MS) includes:

receiving, in a downlink frame, a message containing relevant information of a downlink interval usage code (DIUC) used by a downlink burst and an information element (IE) which indicates updating of said message and which is provided in an MBS-MAP message;

judging, in the mobile station (MS), whether the message update information element (IE) carried in a received MBS-MAP message is identical to a reserved message update information element, if yes, the mobile station (MS) directly receiving other messages of a multicast and broadcast service (MBS) zone according to the reserved DIUC-relevant information, otherwise, the mobile station (MS) receiving the message which is sent in the above step and is related to the message update information element (IE) carried by the MBS-MAP message, and analyzing other messages in the multicast and broadcast service zone according to the DIUC-relevant information comprised in this message;

the mobile station (MS) receiving MBS service data according to the analyzing result of other messages in the multicast and broadcast service zone.

According to another aspect of the invention, a cellular telephone system is provided, including a plurality of base stations operable to provide modulation and coding mode information used for multicast service macro diversity and a plurality of mobile stations (MS), said base stations being arranged to send a message which contains relevant information of modulation and coding mode(s) indicated by a downlink interval usage code (DIUC) and used in a multicast and broadcast service (MBS) zone;

said mobile stations (MS) being operable for receiving the message, analyzing other messages in the multicast and broadcast service zone according to the DIUC-relevant information contained in the message, and receiving MBS service data according to the analyzing result of other messages in the multicast and broadcast service zone;

wherein said message which contains relevant information is contained in the multicast and broadcast service zone of a downlink frame.

According to another aspect of the invention, a cellular telephone system is provided, including a plurality of base stations operable to provide modulation and coding mode information used for multicast service macro diversity and a plurality of mobile stations (MS):

said base stations being arranged to send in a downlink frame a message containing relevant information of a downlink interval usage code (DIUC) used by a downlink burst, said mobile stations (MS) being operable for judging whether a message update information element (IE) carried in a downlink frame is identical to a reserved message update information element (IE), if yes, the mobile station (MS) directly receiving other messages of a multicast and broadcast service (MBS) zone according to the reserved DIUC-relevant information, otherwise, the mobile station (MS) receiving the message which is sent in the above step and is related to the message update information element (IE), and analyzing other messages in the multicast and broadcast service zone according to the DIUC-relevant information comprised in this message; and receiving MBS service data according to the analyzing result of other messages in the multicast and broadcast service zone;

wherein an information element (IE) indicating the update of said message is added into an MBS-MAP message.

According to another aspect of the invention, an apparatus for providing modulation and coding mode information used for multicast service macro diversity includes:

said apparatus being arranged for sending a message which contains relevant information of modulation and coding mode(s) indicated by a downlink interval usage code (DIUC) and used in a multicast and broadcast service (MBS) zone;

wherein said message which contains relevant information is contained in the multicast and broadcast service zone of a downlink frame.

According to another aspect of the invention, an apparatus for providing modulation and coding mode information used by multicast service macro diversity, includes:

said apparatus being operable for sending in a downlink frame a message containing relevant information of a downlink interval usage code (DIUC) used by a downlink burst, wherein said apparatus is further operable to add an information element (IE) indicating the update of said message into an MBS MAP (MBS-MAP) message.

According to another aspect of the invention, a mobile station (MS) for receiving MBS service data is provided, said mobile station (MS) being operable for receiving in the multicast and broadcast service zone of a received downlink frame a message which contains relevant information of modulation and coding mode(s) indicated by a downlink interval usage code (DIUC) and used in a multicast and broadcast service (MBS) zone;

for analyzing other messages in the multicast and broadcast service zone according to the DIUC-relevant information contained in the received message; and for receiving the MBS service data according to the analyzing result of said other messages in the multicast and broadcast service zone.

According to another aspect of the invention, a mobile station for receiving MBS service data is provided, said mobile station (MS) being operable:

for receiving, in a downlink frame, a message containing relevant information of a downlink interval usage code (DIUC) used by a downlink burst and an information element (IE) which indicates updating of said message and which is provided in an MBS-MAP message;

for judging whether the message update information element (IE) carried in a received MBS-MAP message is identical to a reserved message update information element (IE), if yes, the mobile station (MS) being operable to directly receive other messages of a multicast and broadcast service (MBS) zone according to the reserved DIUC-relevant information, otherwise, the mobile station (MS) receiving the message which is sent in the above step and is related to the message update information element (IE) carried by the MBS-MAP message, and analyzing other messages in the multicast and broadcast service zone according to the DIUC-relevant information comprised in this message; and for receiving MBS service data according to the analyzing result of other messages in the multicast and broadcast service zone.

According to another aspect of the invention, a base station for use in a cellular telecommunications network includes:

(a) an input section for receiving data to be transmitted by the base station;

(b) a processing section operable for receiving data from said input section and generating downlink frames at least some of which include:

(i) a traffic portion which contains bursts of traffic data, and (ii) a multicast/broadcast portion which contains bursts of multicast/broadcast data, a multicast/broadcast service downlink channel description message identifying modulation and coding modes available for use in said bursts of multicast/broadcast data, and a multicast/broadcast service map message identifying, for each respective one of said bursts of multicast/broadcast data, which of said available modulation and coding modes is used therein, and (c) a transmitter section for transmitting said downlink frames generated by said processing section.

According to another aspect of the invention, a base station for use in a cellular telecommunications network includes:

(a) an input section for receiving data to be transmitted by the base station;

(b) a processing section operable for receiving data from said input section and generating downlink frames at least some of which include a traffic portion containing bursts of traffic data and a multicast/broadcast portion containing bursts of multicast/broadcast data, and (i) said traffic portion further containing a downlink channel description message identifying modulation and coding modes available for use in said bursts of traffic data and said bursts of multicast/broadcast data, and a downlink map message identifying, for each respective one of said bursts of traffic data, which of said available modulation and coding modes is used therein, (ii) said multicast/broadcast portion further containing a multicast/broadcast service map message identifying, for each respective one of said bursts of multicast/broadcast data, which of said available modulation and coding modes is used therein, and (iii) said traffic portion and said multicast/broadcast portion each containing an information element indicating a change in the available said modulation and coding modes; and (c) a transmitter section for transmitting said downlink frames generated by said processing section.

According to another aspect of the invention, a base station for use in a cellular telecommunications network includes:

(a) an input section for receiving data to be transmitted by the base station;

(b) a processing section operable for receiving data from said input section and generating downlink frames at least some of which include:

(i) a traffic portion which contains bursts of traffic data, and (ii) a multicast/broadcast portion which contains bursts of multicast/broadcast data, a multicast/broadcast service downlink channel description message identifying modulation and coding modes available for use in said bursts of multicast/broadcast data, and a multicast/broadcast service map message, said multicast/broadcast service map message identifying, for each respective one of said bursts of multicast/broadcast data, which of said available modulation and coding modes is used therein and containing an information element indicating a change in the available said modulation and coding modes; and (c) a transmitter section for transmitting said downlink frames generated by said processing section.

According to another aspect of the invention, a mobile station for use in a cellular telecommunications network includes:

(a) receiver section for receiving downlink frames; and (b) a processing section operable for processing received downlink frames at least some of which include:

(i) a traffic portion which contains bursts of traffic data, and (ii) a multicast/broadcast portion which contains bursts of multicast/broadcast data, a multicast/broadcast service downlink channel description message identifying modulation and coding modes available for use in said bursts of multicast/broadcast data, and a multicast/broadcast service map message identifying, for each respective one of said bursts of multicast/broadcast data, which of said available modulation and coding modes is used therein;

(c) said processing section including a demodulator and decoder and a controller responsive to the multicast/broadcast service map message to control the demodulator and decoder so that said multicast/broadcast data is demodulated and decoded utilizing said multicast/broadcast service downlink channel description message contained in said multicast/broadcast portion of said downlink frames.

According to another aspect of the invention, a mobile station for use in a cellular telecommunications network includes:

(a) a receiver section operable for receiving downlink frames; and (b) a processing section operable for processing received downlink frames at least some of which include a traffic portion containing bursts of traffic data and a multicast/broadcast portion containing bursts of multicast/broadcast data and in which (i) said traffic portion further contains a downlink channel description message identifying modulation and coding modes available for use in said bursts of traffic data and said bursts of multicast/broadcast data, and a downlink map message identifying, for each respective one of said bursts of traffic data, which of said available modulation and coding modes is used therein, (ii) said multicast/broadcast portion further contains a multicast/broadcast service map message identifying, for each respective one of said bursts of multicast/broadcast data, which of said available modulation and coding modes is used therein, and (iii) said traffic portion and said multicast/broadcast portion each contain an information element indicating an updated downlink channel description message;

(c) said processing section including a demodulator and decoder and a controller responsive:

(i) to the downlink map message to control the demodulator and decoder so that said traffic data and said multicast/broadcast data are demodulated utilizing said downlink channel description message contained in said traffic portion of said downlink frames, and (ii) to said information element in said traffic portion and to said information element in said multicast/broadcast portion to cause said data to be demodulated and decoded utilizing the updated downlink channel description message.

According to another aspect of the invention, a mobile station for use in a cellular telecommunications network includes:

(a) a receiver section for receiving downlink frames;

(b) a processing section operable for processing downlink frames at least some of which include (i) a traffic portion which contains bursts of traffic data, and (ii) a multicast/broadcast portion which contains bursts of multicast/broadcast data, a multicast/broadcast service downlink channel description message identifying modulation and coding modes available for use in said bursts of multicast/broadcast data, and a multicast/broadcast service map message, said multicast/broadcast service map message identifying, for each respective one of said bursts of multicast/broadcast data, which of said available modulation and coding modes is used therein and containing an information element indicating an updated multicast/broadcast service downlink channel description message; and (c) said processing section including a demodulator and decoder and a controller responsive (i) to the multicast/broadcast service map message to control the demodulator and decoder so that said multicast/broadcast data is demodulated utilizing said multicast/broadcast downlink channel description message contained in said multicast/broadcast portion of said downlink frames, and (ii) to said information element in said multicast/broadcast portion to cause said data to be demodulated and decoded utilizing the updated multicast/broadcast service downlink channel description message.

In the solution of the invention, a MBS-DCD message containing the definition and index of the modulation and coding mode used by MBS ZONE is added into the MBS ZONE, the MS receives the downlink MBS service according to the definition and index contained in this message. Transmission of the added MBS-DCD message is specified in the MBS-MAP message, wherein the MBS-MAP message is transmitted by MBS Server, so that the added MBS-DCD messages are uniformly managed by MBS Server in the MBS ZONE, without the need of introducing a new entity to uniformly manage the DCD messages of all cells in the same MBS ZONE as in the prior art.

In the embodiments of the invention, the MBS-MAP message is enhanced by adding an IE indicating the DCD message update, so that the MS can judge whether to receive the new DCD message according to the fact whether this IE is identical to the corresponding IE in the current DCD message reserved by itself, thereby the MS need not continuously track the DL-MAP message, unless it is detected that the IE of MBS-MAP message is not identical to the corresponding IE in the current DCD message reserved by itself. Thus the receiver in IDLE state or SLEEP state need not continuously monitor the DL-MAP message of current service cell and power consumption of the MS is reduced.

In the embodiments of the invention, by setting MBS-DCD message in MBS ZONE and enhancing the MBS-MAP message, the MBS-DCD messages in MBS ZONE are uniformly managed through the MBS Server and there is no need to introduce a new entity to uniformly manage the DCD messages of all cells in the same MBS ZONE, and the MS can determine whether to receive the new MBS-DCD message by judging whether the IE, which is added into the MBS-MAP message and is used to indicate the MBS-DCD message update, is identical to the corresponding IE in the current MBS-DCD message reserved by itself, so that the MS need not to continuously track the DL-MAP message, so that the receiver in IDLE state or SLEEP state need not continuously monitor the DL-MAP message of current service cell and power consumption of the MS is reduced.

EMBODIMENTS OF THE INVENTION

The solution of the invention will be illustrated in detail hereinafter with reference to specific embodiments.

Figure 1:
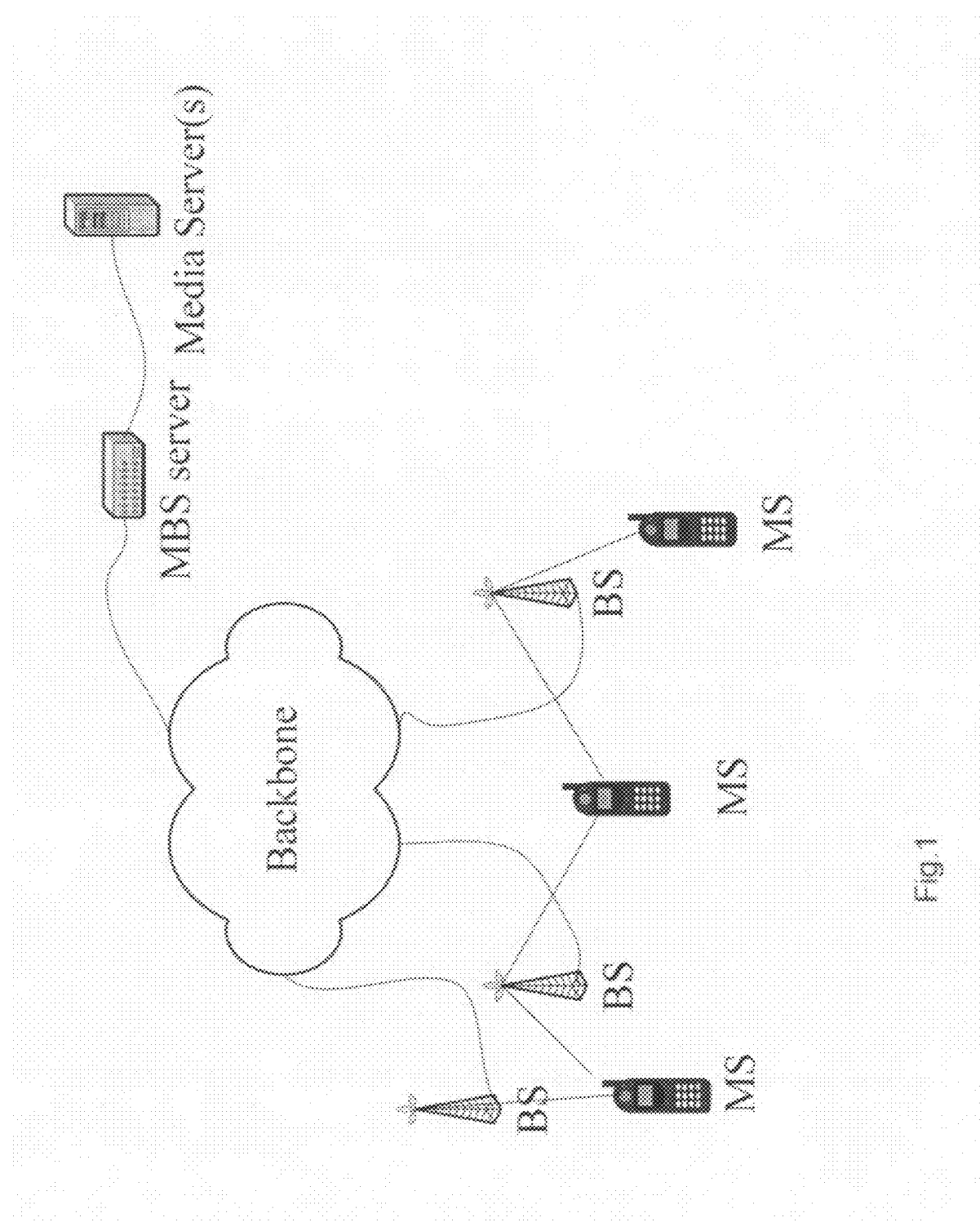
FIG. 1 is a schematic diagram illustrating a system structure supporting the MBS service in IEEE802.16 in the prior art.
Figure 2:
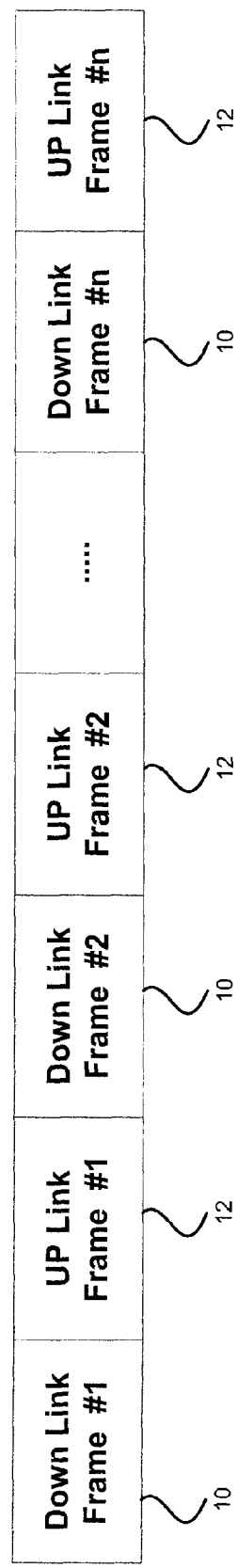
FIG. 2 is a diagram showing the sequence of transmission of downlink and uplink frames respectively.

In operation of the cellular telecommunications system shown in FIG. 1, information is transmitted from the base stations BS to the mobile stations MS in a series of spaced apart downlink frames 10 as shown in FIG. 2 and information from the mobile stations MS to the base stations BS is transmitted in a series of spaced apart uplink frames 12. Also as illustrated in FIG. 2, the downlink frames 10 and uplink frames 12 are transmitted alternately.

Figure 3:
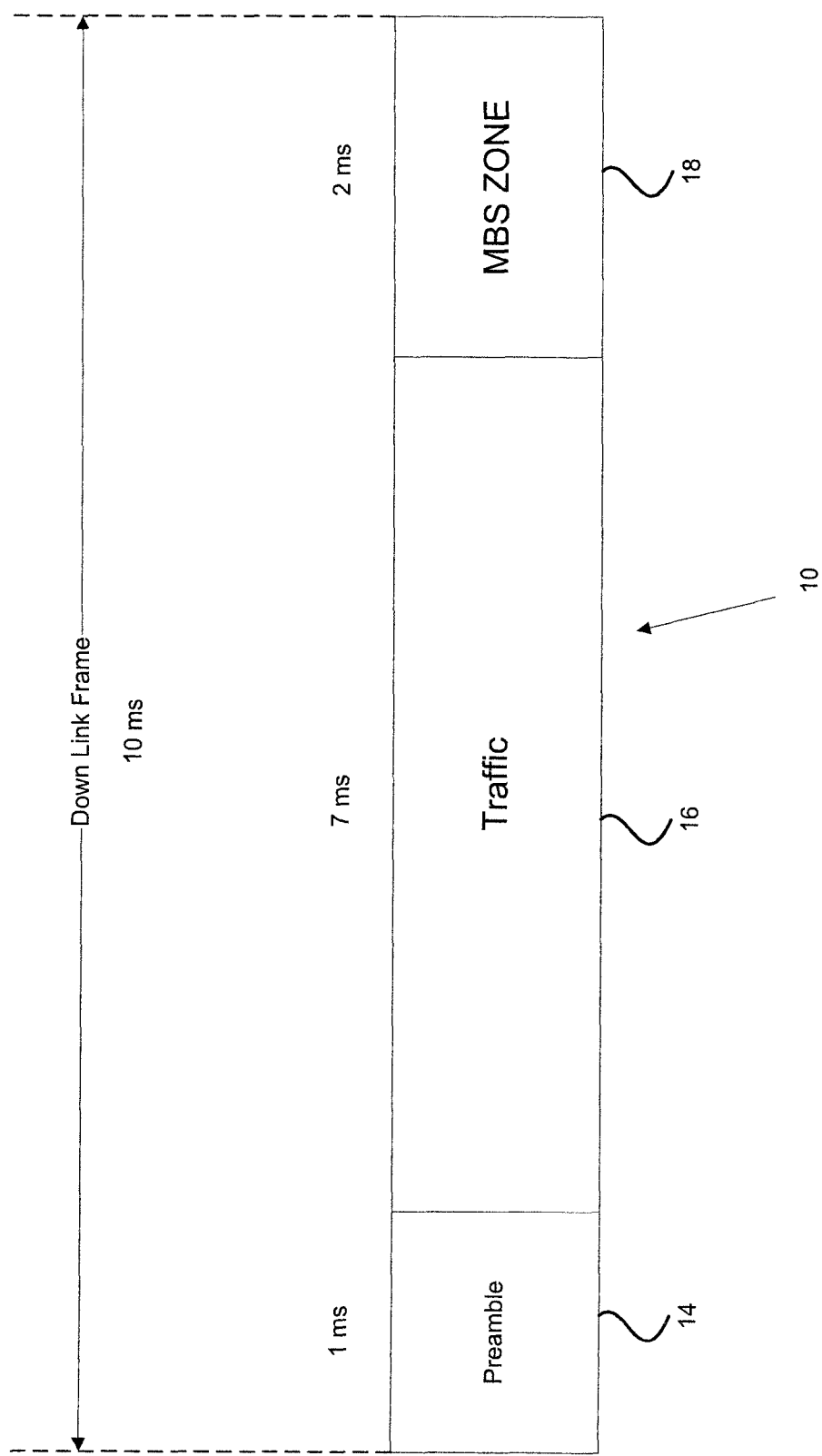
FIG. 3 is a diagram showing the main components of a downlink frame.

As illustrated in FIG. 3, each downlink frame 10 is divided into three main time periods 14, 16 and 18. The time period 14, which is at the beginning of the frame, contains a conventional preamble and need not be described further. The second time period 16 immediately follows the preamble period 14 and contains traffic data, such as digital data representing voice telephone calls. The third time period 18 which is known as the MBS zone immediately follows the traffic period 16 and contains multicast and broadcast data. As shown in FIG. 3, the time periods 14, 16 and 18 may, by way of example, last respectively for 1 ms, 7 ms and 2 ms. Further, the MBS zone 18 is not necessarily present in all downlink frames.

As will be explained more fully later, the data transmitted in the traffic period 16 and the MBS zone 18 is organized in bursts which may be encoded and modulated by coding and modulation modes which may differ from one burst to another in the same downlink frame and/or may differ from one downlink frame to the next. To enable the mobile stations MS to decode and demodulate the bursts, therefore, it is necessary to transmit to the mobile station MS data identifying the modulation and coding modes which have been employed in the transmitted bursts. This data comprises a DIUC definition (downlink interval usage code definition) which lists the identities of the coding and modulation modes currently available for use in the downlink frames and a DCD count (downlink channel description) which is incremented each time the DIUC definition changes so as to notify the mobile station of this change.

The first embodiment of the invention is to add an MBS-DCD message, i.e. a DIUC value, in the MBS ZONE to define the modulation and coding mode used in current MBS ZONE. The structure of the defined MBS-DCD message is as shown in table 2.

TABLE 2

| Syntax | Size | Notes |
|---|---|---|
| MBS-DCD_Message_Format( ) { | | |
|   Management Message Type = ? | 8 bits | MBS_MAP = 0x05 |
|   Begin PHY Specific Section { | | See applicable PHY section |
|     for (I = 1; i <= n; i++) { | | For each downlink burst profile 1 to n |
|       Downlink_Burst_Profile | | PHY specific |
|     } | | |
|   } | | |
| } | | |

Wherein, the definition of Downlink_Burst_Profile in Table 2 is given in chapter 11.4.2 of IEEE802.16-2004, in the MBS-DCD message, Downlink_Burst_Profile defines the specific meaning of each 4-bit DIUC index.

In addition, as other messages set in the MBS ZONE, transmitting position of the MBS-DCD message should be specified in the MBS-MAP message.

After the setting, when receiving MBS service, the MS determines the position of MBS-MAP message, and tracks this message until the corresponding MBS-DCD message is correctly received, then analyzes other messages in the MBS ZONE with relevant description upon DIUC in the MBS-DCD message, and receives the downlink MBS service according to the analyzed result.

In the present embodiment, an MBS-DCD message containing the definition and index of the modulation and coding mode used in MBS ZONE is added into the MBS ZONE, according to the definition and index of the modulation and coding mode contained in the message, the MS receives the downlink MBS service. The transmission of the added MBS-DCD message is specified in the MBS-MAP message that is sent by the MBS Server, and the MBS-DCD message is uniformly managed by the MBS Server in the MBS ZONE, so there is no need to introduce a new entity to uniformly manage the DCD messages of all cells in the same MBS ZONE as in the prior art.

The second embodiment of the invention is to improve current MBS-MAP message so as to track the change of DCD message. An IE of DCD count is added into the MBS-MAP message, so that the update of DCD message can be recorded by this IE. The IEs of the improved MBS-MAP message is as shown in FIG. 3.

TABLE 3

| Syntax | Size | Notes |
|---|---|---|
| MBS-MAP_Message_Format( ) { | | |
|   Management Message Type = ? | 8 bits | |
|   DCD count | 8 bits | |
|   Frame number | 24 bits | The frame number is identical to the frame number in the DL-MAP |
|   for (i = 0; i < n; i++) { | | |
|     Multicast CID | 12 bits | 12 LSB of CID for multicast |
|     DIUC | 4 bits | |
|     OFDMA Symbol offset | 8 bits | OFDMA symbol offset with respect to start of the MBS zone |
|     Subchannel offset | 6 bits | |
|     Boosting | 3 bits | 000: normal (not boosted); 001: +6 dB; 010: −6 dB; 011: +9 dB; 100: +3 dB; 101: −3 dB; 110: −9 dB; 111: −12 dB; |
|     No. OFDMA Symbols | 7 bits | |
|     No. Subchannels | 6 bits | |
|     Repetition Coding Indication | 2 bits | 0b00 No repetition coding<br>0b01 Repetition coding of 2 used<br>0b10 Repetition coding of 4 used<br>0b11 Repetition coding of 6 used |
|     Next MBS frame offset | 8 bits | The Next MBS frame offset value is lower 8 bits of the frame number in which the BS shall transmit the next MBS frame. |
|     Next MBS OFDMA Symbol offset | 8 bits | The offset of the OFDMA symbol in which the next MBS zone starts, measured in OFDMA symbols from the beginning of the downlink frame in which the MBS-MAP is transmitted. |
|   } | | |
|   if !(byte boundary) { | | |
|     Padding Nibble | 4 bits | Padding to reach byte boundary. |
|   } | | |
| } | | |

In this way, when receiving the MBS-MAP message, the MS checks whether the carried DCD count is identical to the Configuration Change Count reserved in the current DCD message, if identical, the MS receives the MBS service normally; otherwise, the MS tracks the DCD message until the Configuration Change Count contained in the new received DCD message is identical to the DCD count in the MBS-MAP message. Then the MS analyzes other messages in the MBS ZONE according to the relevant description upon DIUC message in this new DCD message, and receives the downlink MBS service according to the analyzed result.

In the present embodiment, the MBS-MAP message is improved by adding an IE indicating the update of MBS-DCD message, so that the MS can decide whether to receive the new DCD message according to the fact whether this IE is identical to the corresponding IE in the current DCD message reserved by the MS, thereby the MS need not continuously track the DL-MAP message, unless it is detected that the IE of the MBS-MAP message is not identical to the counterpart in the current DCD message reserved by the MS, so that the receiver in IDLE mode or SLEEP mode need not continuously monitor the DL-MAP messages of current service cell and power consumption of the MS is reduced.

The third embodiment of the invention is to add an MBS-DCD message, i.e., a DIUC value, in the MBS ZONE at first to define the modulation and coding mode used in current MBS ZONE. The MBS-DCD message is as shown in table 4.

TABLE 4

| Syntax | Size | Notes |
|---|---|---|
| DCD_Message_Format( ) { | | |
|    Management Message Type = ? | 8 bits | MBS_MAP = 0x05 |
|    Configuration Change Count | 8 bits | |
|    Begin PHY Specific Section { | | See applicable PHY section |
|      for (i = 1; i <= n; i++) { | | For each downlink burst profile 1 to n |
|        Downlink_Burst_Profile | | PHY specific |
|      } | | |
|    } | | |
| } | | |

Wherein, the definition of Downlink_Burst_Profile is in reference to chapter 11.4.2 of IEEE802.16-2004. Besides, the transmission position of MBS-DCD message needs to be specified in the MBS-MAP message.

Meanwhile, the MBS-MAP message should be improved to track the change of MBS-DCD message. Therefore, a MBS-DCD count IE is added into the MBS-MAP message, which can indicate the update of the MBS-DCD message. The improved MBS-MAP message is as shown in Table 5.

TABLE 5

| Syntax | Size | Notes |
|---|---|---|
| MBS-MAP_Message_Format( ) { | | |
|    Management Message Type = ? | 8 bits | |
|    MBS-DCD count | 8 bits | |
|    Frame number | 24 bits | The frame number is identical to the frame number in the DL-MAP |
|    for (i = 0; i < n; i++) { | | |
|      Multicast CID | 12 bits | 12 LSB of CID for multicast |
|      DIUC | 4 bits | |
|      OFDMA Symbol offset | 8 bits | OFDMA symbol offset with respect to start of the MBS zone |
|      Subchannel offset | 6 bits | |
|      Boosting | 3 bits | 000: normal (not boosted); 001: +6 dB; 010: −6 dB; 011: +9 dB; 100: +3 dB; 101: −3 dB; 110: −9 dB; 111: −12 dB; |
|      No. OFDMA Symbols | 7 bits | |
|      No. Subchannels | 6 bits | |
|      Repetition Coding Indication | 2 bits | 0b00 No repetition coding<br>0b01 Repetition coding of 2 used<br>0b10 Repetition coding of 4 used<br>0b11 Repetition coding of 6 used |
|      Next MBS frame offset | 8 bits | The Next MBS frame offset value is lower 8 bits of the frame number in which the BS shall transmit the next MBS frame. |
|      Next MBS OFDMA Symbol offset | 8 bits | The offset of the OFDMA symbol in which the next MBS zone starts, measured in OFDMA symbols from the beginning of the downlink frame in which the MBS-MAP is transmitted. |
|    } | | |
|    if !(byte boundary) { | | |
|      Padding Nibble | 4 bits | Padding to reach byte boundary. |
|    } | | |
| } | | |

After the setting, when receiving the MBS-MAP message, the MS checks whether the carried DCD count is identical to the Configuration Change Count reserved in the current DCD message at first, if identical, the MS will receive the MBS service normally; otherwise, the MS will continuously track the DCD message until the Configuration Change Count contained in the received new DCD message is identical to the MBS-DCD count in the MBS-MAP message. Then the MS will analyze other messages in the MBS ZONE according to the relevant description upon DIUC message in this new DCD message, and receive the downlink MBS service according to the analyzed result.

In the present embodiment, by setting the MBS-DCD message in MBS ZONE and improving the MBS-MAP message, it is realized that the MBS-DCD message in MBS ZONE is uniformly managed by the MBS Server, so that there is no need to introduce a new entity to uniformly manage the DCD messages of all cells in the same MBS ZONE, further, the MS can determine whether to receive the new MBS-DCD message by the fact whether the IE, which is added into the MBS-MAP message and used to indicate the update of the MBS-DCD message, is identical to the corresponding IE reserved in the current MBS-DCD message, so that the MS need not continuously track the DL-MAP message, so that the receiver in IDLE state or SLEEP state need not continuously monitor the DL-MAP messages of current service cell and power consumption of the MS is reduced.

Thus, by way of summary, the three embodiments of the invention which have been described above organize the DIUC definition and the DCD count in three different novel ways as follows:

1. In the first embodiment, the DIUC definition relating to the modulation and coding modes used for the bursts in the traffic period 16, and the corresponding DCD count, are both transmitted in the traffic period 16; and the DIUC definition which relates to the modulation and coding modes used for the bursts of the MBS zone 18 is transmitted in the MBS zone 18 itself. There is no DCD count relating to the DIUC definition for the MBS zone 18. In this embodiment, mobile stations which are receiving only MBS data monitor the DIUC definition in the MBS zone 18 each frame which contains an MBS zone, but they do not need to monitor the data transmitted in the traffic period 16.

2. In the second embodiment, the DIUC definition relating to the modulation and coding modes used for the bursts in both traffic period 16 and MBS zone 18 is transmitted within the traffic period 16; and the DCD count appears twice in each frame which contains an MBS zone, once in the traffic period 16 and once in the MBS zone 18. In this embodiment, mobile stations which are only receiving data in the MBS zone monitor the DCD count in the MBS zone each frame which contains an MBS zone and they only have to monitor the data in the traffic period 16 when the DCD count changes indicating a change in the DIUC definition.

3. In the third embodiment, the DIUC definition relating to the MBS zone 18 and the corresponding DCD count are both transmitted in the MBS zone 18; and a DIUC definition relating to the traffic period 16 and related DCD count are both transmitted in the traffic period 16. In this embodiment, mobile stations receiving only MBS data do not have to monitor the traffic zone 16 at all. They monitor only the DCD count received in the MBS zone 18 each frame containing an MBS zone until this changes, at which time they monitor the new DIUC definition received in the MBS zone 18.

An implementation of the third embodiment will now be described in more detail with reference to FIGS. 4 to 9.

Figure 4:
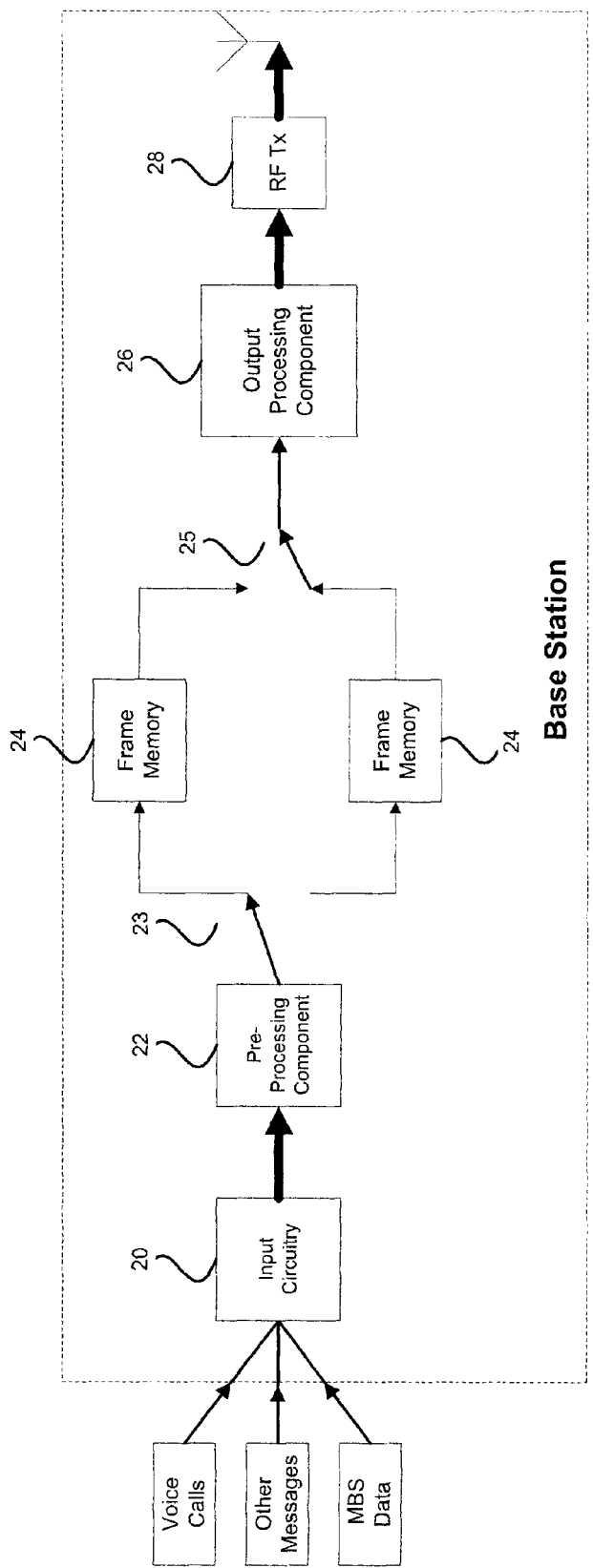
FIG. 4 is a simplified block diagram of a base station, illustrating frame memories in which the data is assembled before transmission.

With reference to FIG. 4, the base station BS includes input circuitry 20 for receiving data from the backbone 2 or another source or sources such as the up-layer or Internet, preprocessing components 22 for preprocessing the received data and supplying it to first and second frame memories 24, and output processing components 26 which receive data from the frame memories 24 and prepare it for transmission by a radio-frequency transmitter 28. The components 22 and 26 may be implemented in hardware and/or software as appropriate. The data received from the backbone 2 will in practice originate from a variety of sources but will typically comprise MBS data from the MBS server 4, data representing voice calls and data representing other messages. The preprocessing components 22 include an encoder and an interleaver so that, as is conventional, the data provided to each frame memory 24 is in the form of interleaved digital data symbols. These symbols are assembled in the frame memories 24 in a manner such that the downlink frames 10 are formed when the symbols are read out and processed by the components 26 in preparation for transmission. The arrangement is such that, as indicated by the arrows 23 and 25 in FIG. 4, while data from the preprocessing components 22 is being read into and assembled in one of the frame memories 24, data previously assembled in the other is read out to the output processing components 26.

Figure 5:
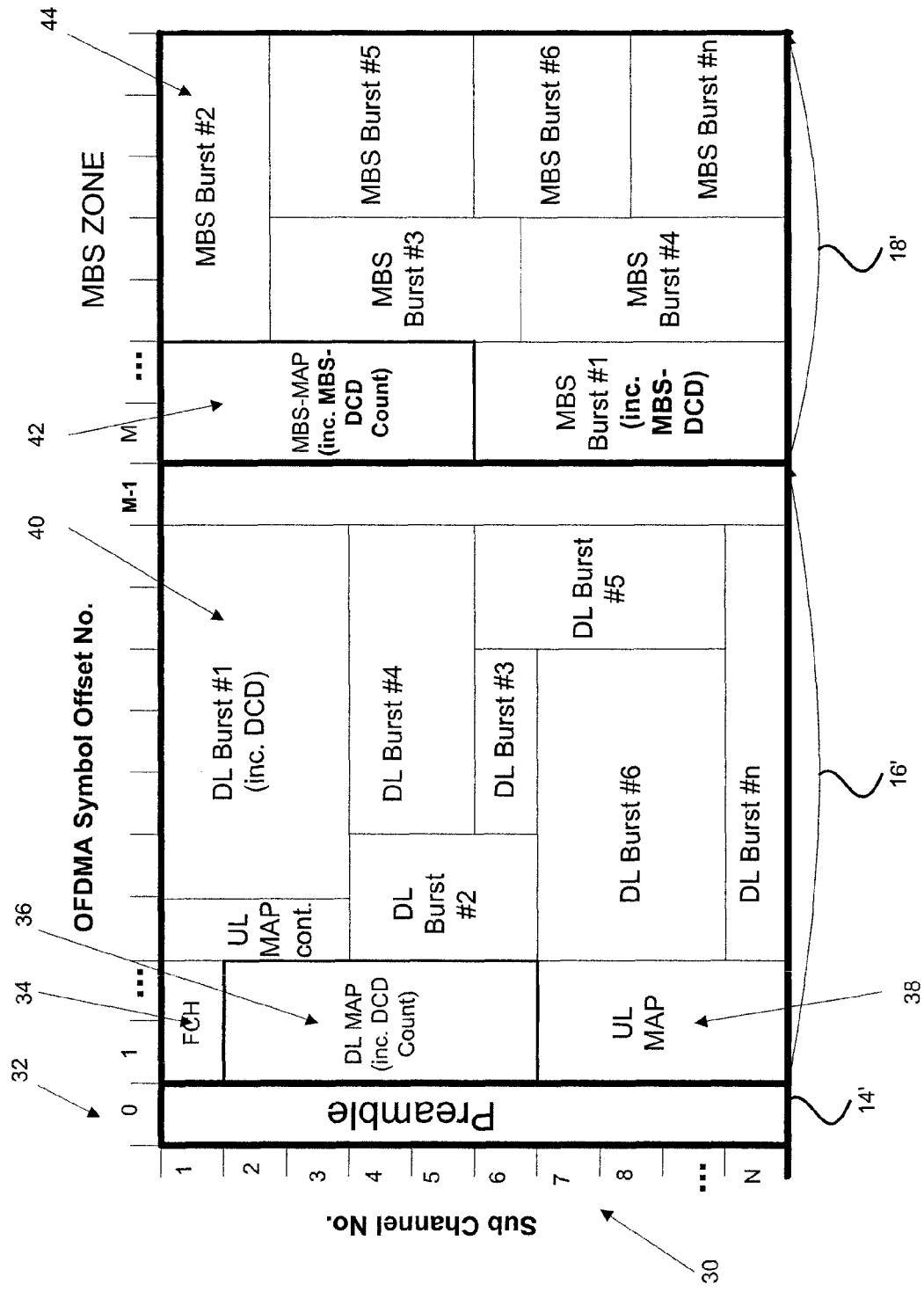
FIG. 5 is a diagram showing the arrangement of data, in accordance with an embodiment of the invention, as stored in the frame memories in the base station illustrated in FIG. 4.

Each frame memory 24 comprises a plurality of memory cells, each for containing a single data symbol, arranged in rows 30 and columns 32 as shown in FIG. 5, to form a rectangular array. The position of any data symbol within the frame memory 24 can accordingly be defined by identifying the row 30 and the column 32 at the intersection of which the relevant memory cell is located. As shown in FIG. 5, the rows are actually referred to as "subchannels". This is because the output processing components 26 of the base station BS carry out an inverse fast Fourier transform such that each row is assigned to a different subchannel. As also shown in FIG. 5, the columns 32 are referred to as OFDMA (orthogonal frequency division multiple access) symbol offset numbers. Thus, the position of each data symbol can be defined by its subchannel number and its OFDMA symbol offset number.

The data symbols which constitute the preamble, the traffic and the MBS data are assembled in each frame memory 24 in three segments thereof labeled respectively 14', 16' and 18' for consistency with FIG. 3. The segment 14' is shown as occupying a single column corresponding to OFDMA symbol number 0, the segment 16' is shown as occupying the columns corresponding to OFDMA symbol numbers 1 to M−1, and the segment 18' is shown as occupying the columns from OFDMA symbol number M onwards. As already indicated, the preamble is conventional and need not be described further.

The segment 16' contains, in the first few columns, a frame control header 34, a downlink map 36 and an uplink map 38. The remainder of the segment 16' is occupied by a number of data bursts 40, the first of which identified as DL burst 1 contains the downlink channel description (DCD) message and the remainder of which contain traffic such as voice call data.

The segment 18', identified as the MBS zone, contains, in this embodiment, an MBS-MAP message 42, which includes the MBS-DCD count, and a number of data bursts 44, the first of which contains the MBS downlink channel description (MBS-DCD) message.

The position and size of each burst 40, 44 when stored within the frame memory 24 can thus be defined by the subchannel number and OFDMA symbol offset number of its extreme upper left-hand symbol (as seen in FIG. 5) and the number of rows and columns (i.e., the number of subchannels and OFDMA symbols) over which it extends.

To enable the mobile stations MSs to decode the bursts 40 and 44 it is necessary for the mobile stations to receive information which defines the position and size of each burst and the modulation and coding mode used for the burst. In this embodiment, this information is provided:

(a) in relation to the bursts 40 by the downlink map message 36 and the downlink channel description (DCD) message provided in the first burst (burst 1) of the bursts 40;

(b) in relation to the bursts 44 by the MBS-MAP message 42 and the MBS-DCD (MBS downlink channel description) message provided, in the MBS zone, in the first burst (burst 1) of the bursts 44.

Figure 6:
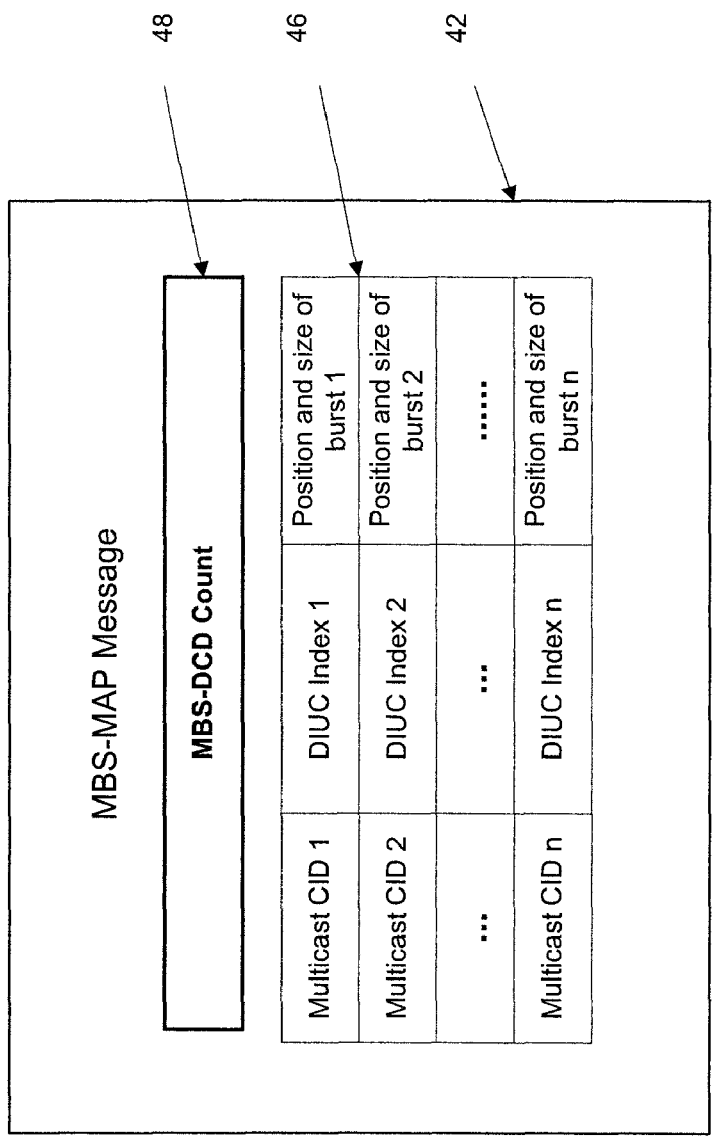
FIG. 6 is a diagram showing and MBS-MAP message included in the data illustrated in FIG. 5.

As shown in FIG. 6, the MBS-MAP message comprises a table 46 having a number of lines each corresponding to a respective different one of the bursts 44. Each line contains the multicast CID (connection identifier) of the burst, the downlink interval usage code (DIUC) for the burst, which is an index number used for identifying the coding and modulation mode used for the burst, and the position and size of the burst defined as described above by the position of the top left-hand corner of the burst (as seen in FIG. 5) in terms of OFDMA symbol offset and subchannel number and the number of subchannels and OFDMA symbols over which it extends.

At any given time, a subset of all of the possible modulation and coding modes will be available for use and from time to time the available modes will change. To indicate when a change in the available modes arises, the MBS-MAP message also includes an MBS-DCD count 48, which is a number which is incremented by one each time there is a change in the available subset of modulation and coding modes.

Figure 7:
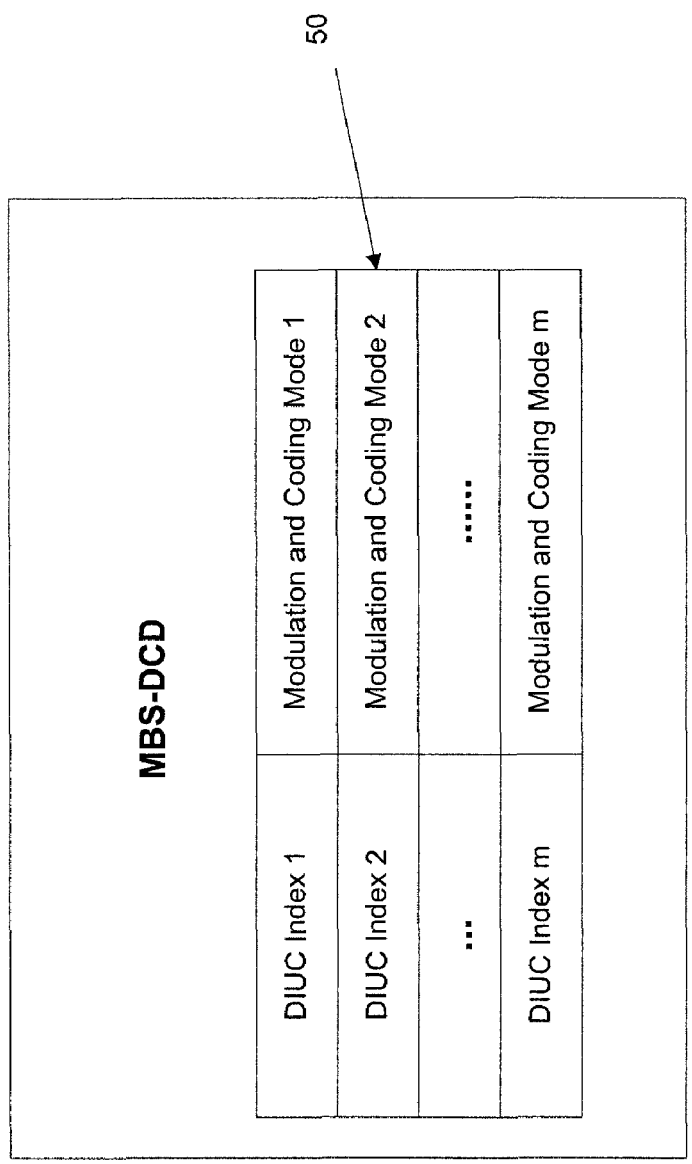
FIG. 7 is a diagram showing in MBS-DCD message included in the data illustrated in FIG. 5.

The subset of currently available coding and modulation modes is identified in a look-up table 50 as shown in FIG. 7, which constitutes the MBS-DCD message which is, as already indicated, contained in the first of the bursts 44. Table 50, as shown in FIG. 7, contains a list of the identities of the currently available modulation and coding modes, identified as mode 1, mode 2 . . . etc., and, next to the identity of each mode, the DIUC index number which relates to it. Thus, the receiver, when processing the MBS-MAP message, uses the DIUC index number relating to each burst in order to obtain, from the look-up table 50, the identity of the modulation mode for the burst.

Figure 8:
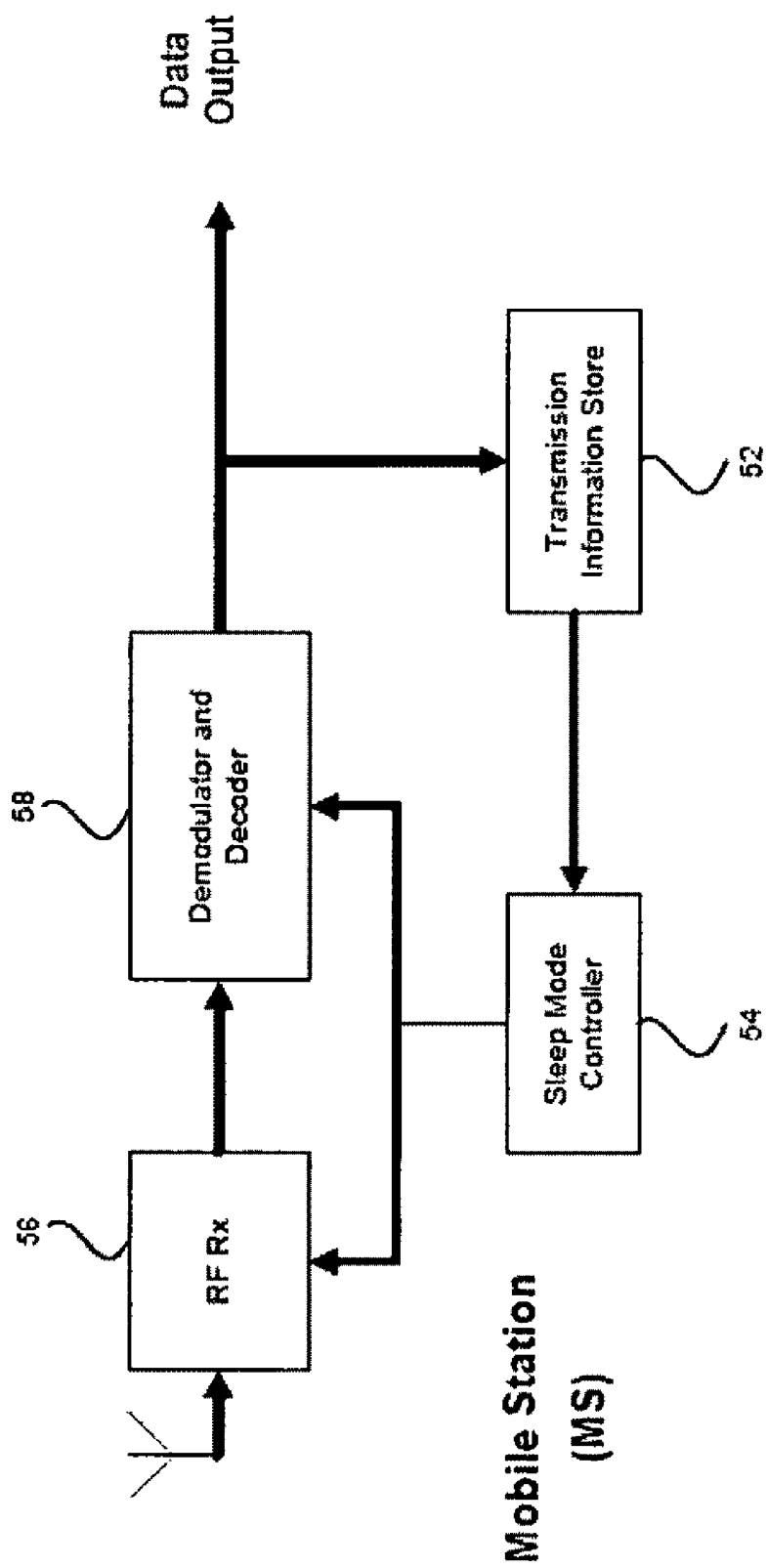
FIG. 8 is a simplified block diagram of the main components of a mobile station for receiving downlink frames constructed as illustrated in FIGS. 5, 6 and 7.

It follows that when a mobile station MS is receiving MBS messages it can detect a change in the available subset of modulation and coding modes by simply monitoring the MBS-DCD count 48 in the MBS-MAP message. When it detects that this count is changed, it can receive and decode the new MBS-DCD message containing the new available subset of the modulation and coding modes. Thus, as shown in FIG. 8, the mobile station MS includes a transmission information store 52 for storing the MBS-MAP message 42 and MBS-DCD message 50 and a sleep mode controller 54 which, in dependence upon the information in the transmission information store 52, may cause the RF receiver section 56 and demodulator and decoder section 58 of the mobile station to sleep during periods when they are not required to operate, for example during time periods 16 when the mobile station is receiving only MBS data, thereby saving battery power.

Figure 9:
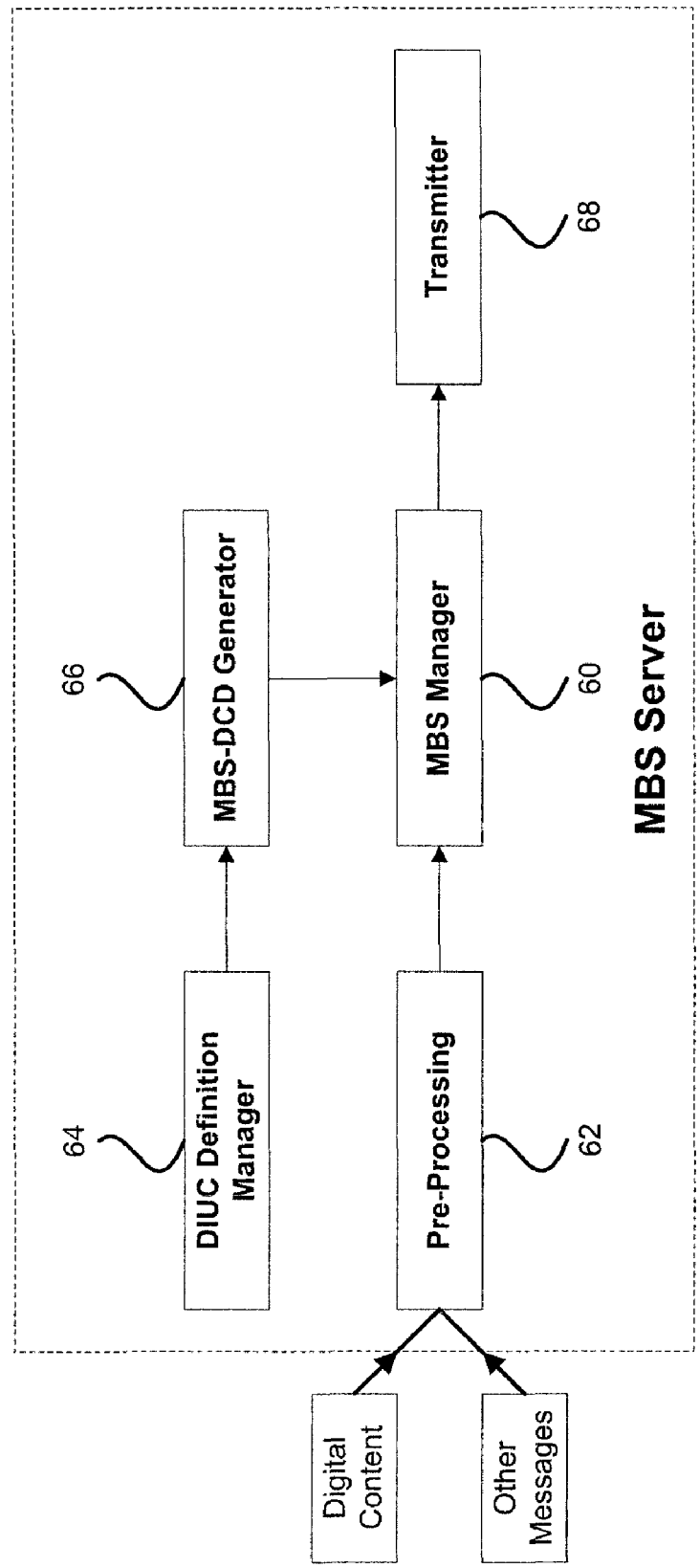
FIG. 9 is a block diagram illustrating components of the MBS server which controls the organization of the data in the MBS zone of the downlink frame and the coding and modulation modes which are employed for that data.

In order to provide for macro diversity combining in a mobile station MS of MBS data transmitted from a number of base stations BS, it is necessary for the data in the MBS zone of the downlink frames transmitted by the different base stations to use the same modulation and coding modes is each other and the same organization of the data. In order to achieve this, the MBS server in accordance with this embodiment of the invention includes, as shown in FIG. 9, a MBS manager module 60 which receives the digital content and other messages from preprocessing modules 62 and determines which of the currently available modulation modes should be used for each of the bursts 44 to be transmitted in the MBS zone and what the size and position of each of those bursts should be within the frame memory 24, in order to optimize usage of the available resources.

In order to enable the MBS manager 60 to decide upon the appropriate coding and modulation mode for each burst 44, the MBS server includes a DIUC definition manager 64 which decides, on the basis of appropriate criteria such as the time of day, which subset of the coding and modulation modes should be currently available for use. On the basis of this decision, an MBS-DCD generator 66 constructs the contents of the look-up table 50 and, when these contents change, generates an instruction for incrementing the MBS-DCD count. The MBS manager 60 assembles information including the MBS-MAP message, the MBS-DCD count, the MBS-DCD message and the size, position and modulation and coding mode for each of the bursts 44 and transfers this information to transmitter portion 68. The transmission portion 68 transmits this information to all of the relevant base stations so that each will assemble the MBS zone data in its downlink frames in the same way, to enable mobile stations to perform macro diversity combining of this data.

Although in the embodiment illustrated in FIGS. 5 to 9, the MBS-DCD count and the MBS-DCD message have both been included in the MBS zone, it is within the scope of the invention, as already explained above, for the MBS-DCD count to be omitted, in which case the mobile stations would receive and monitor the MBS-DCD message contained in each frame containing an MBS zone. Further, as already indicated, it would be possible within the scope of the invention for the MBS-DCD message to be omit it from the MBS zone and instead the information which it provides could be included in the DCD message which is provided in the first of the bursts 40 in the segment 16' of the memory 24, which information would then appear in the traffic periods 16 in the downlink frames. In this case, the DCD count which is included in the downlink map 36 would be repeated in the MBS-MAP message 42.

In view of the foregoing description it will be evident to a person skilled in the art that various modifications may be made within the scope of the invention. While a preferred embodiment of the invention has been described in detail, it should be apparent that many modifications and variations thereto are possible within the scope of the invention.

The invention claimed is:

1. A method for providing modulation and coding mode information used for multicast service macro diversity, comprising:
   sending, by a base station, a message which defines relevant information of modulation and coding mode(s) indicated by a downlink interval usage code (DIUC) and used in a multicast and broadcast service (MBS) zone;
   a mobile station (MS) receiving the message, analyzing other messages in the multicast and broadcast service (MBS) zone according to the DIUC-relevant information contained in the message, and receiving multicast and broadcast service (MBS) service data according to the analyzing result of the other messages in the multicast and broadcast service zone; and
   wherein said message is contained in the multicast and broadcast service (MBS) zone of a downlink frame;
   wherein the message is a multicast and broadcast service downlink channel description (MBS-DCD) message, the method further comprising:
   adding, by a MBS server, an information element (IE) providing an indication of an update of the MBS-DCD message in a MBS-MAP message and,
   the mobile station (MS) judging whether an updated IE of the MBS-DCD message carried in a received MBS-MAP message is identical to an update information reserved in the MBS-DCD message of this mobile station (MS), if yes, the mobile station (MS) directly receiving other messages of the multicast and broadcast service (MBS) zone according to a DIUC-relevant information carried in a MBS-MAP message reserved by the mobile station (MS), otherwise, the mobile station (MS) receiving a new MBS-DCD message which is related to the message update information carried by the MBS-MAP message.

2. The method according to claim 1, wherein the step of the mobile station (MS) receiving the MBS-DCD message comprises: determining a position of the MBS-MAP message and receiving the MBS-DCD message according to the MBS-MAP message.

3. The method according to claim 1, wherein DIUC-relevant information comprises at least one definition and index of the downlink interval usage code (DIUC).

4. A method for providing modulation and coding mode information used by multicast service macro diversity, comprising:
   sending, by a base station, in a downlink frame a message containing relevant information of a downlink interval usage code (DIUC) used by a downlink burst;
   a mobile station (MS) receiving a MBS-MAP message carrying an update information element (IE) indicating an update of the message sent in the downlink frame;
   the mobile station (MS) judging whether the update information element (IE) carried in the received MBS-MAP message is identical to a reserved message update information, if yes, the mobile station (MS) directly receiving other messages of a multicast and broadcast service (MBS) zone according to a reserved DIUC-relevant information, otherwise, the mobile station (MS) receiving the message which is sent in the downlink frame and is related to the update information element (IE) carried by the MBS-MAP message, and analyzing other messages in the multicast and broadcast service zone according to the DIUC-relevant information comprised in this message; and
   the mobile station (MS) receiving MBS service data according to the analyzing result of other messages in the multicast and broadcast service zone.

5. The method according to claim 4, wherein the message of the sending step is a downlink channel description (DCD) message.

6. The method according to claim 5, wherein the step of the mobile station (MS) receiving the message comprises: determining a position of a downlink MAP (DL-MAP) message and receiving the DCD message according to the DL-MAP message.

7. The method according to claim 4, wherein the DIUC-relevant information includes at least one definition and index of the downlink interval usage code (DIUC).

8. A method of receiving multicast and broadcast service (MBS) service data in a mobile station (MS) comprising:
   receiving in a multicast and broadcast service (MBS) zone of a received downlink frame a message which defines relevant information of modulation and coding mode(s) indicated by a downlink interval usage code (DIUC) and used in a multicast and broadcast service (MBS) zone;
   analyzing other messages in the multicast and broadcast service (MBS) zone according to the DIUC-relevant information contained in the received message; and
   receiving the multicast and broadcast service (MBS) data according to the analyzing result of said other messages in the multicast and broadcast service (MBS) zone;
   wherein said message which contains relevant information is a MBS downlink channel description (MBS-DCD) message, and wherein the downlink frame includes, in a MBS-MAP message, an information element (IE) indicating an update of the MBS-DCD message; and further comprising:
   the mobile station (MS) judging whether an updated information element (IE) of the MBS-DCD message carried in a received MBS-MAP message is identical to an update information reserved in the MBS-DCD of this mobile station (MS), if yes, the mobile station (MS) directly receiving other messages of the multicast and broadcast service (MBS) zone according to a DIUC-relevant information carried in a MBS-MAP message reserved by the mobile station (MS), otherwise, the mobile station (MS) receiving a new MBS-DCD message which is related to the message update information element (IE) carried by the MBS-MAP message.

9. The method according to claim 8, comprising:
   determining a position of the MBS-MAP message in the downlink frame; and
   receiving, in the multicast and broadcast service (MBS) zone of the downlink frame, the MBS-DCD message according to the MBS-MAP message.

10. The method according to claim 8, wherein DIUC-relevant information comprises at least one definition and index of the downlink interval usage code (DIUC).

11. A method of receiving MBS service data in a mobile station (MS), comprising:
   receiving an information element (IE), which is provided in a MBS-MAP message, that indicates updating of a message containing relevant information of a downlink interval usage code (DIUC) used by a downlink burst and;
   judging, in the mobile station (MS), whether a message update information element (IE) carried in a received MBS-MAP message is identical to a reserved message update information element, if yes, the mobile station (MS) directly receiving other messages of a multicast and broadcast service (MBS) zone according to a reserved DIUC-relevant information, otherwise, the mobile station (MS) receiving, in a downlink frame, the message that contains relevant information of a downlink interval usage code (DIUC) and is related to the message update information element (IE) carried by the MBS-MAP message, and analyzing other messages in the multicast and broadcast service zone according to the DIUC-relevant information comprised in this message;
   the mobile station (MS) receiving MBS service data according to the analyzing result of other messages in the multicast and broadcast service zone.

12. The method according to claim 11, wherein the message containing the DIUC-relevant information is a downlink channel description (DCD) message.

13. The method according to claim 12, comprising determining a position of the downlink MAP (DL-MAP) message and receiving the DCD message according to this DL-MAP message.

14. The method according to claim 11, wherein the DIUC-relevant information includes at least one definition and index of the DIUC.

15. A cellular telephone system comprising: a plurality of base stations operable to provide modulation and coding mode information used for multicast service macro diversity and a plurality of mobile stations (MS),
   said base stations being arranged to send a message which defines relevant information of modulation and coding mode(s) indicated by a downlink interval usage code (DIUC) and used in a multicast and broadcast service (MBS) zone;

said mobile stations (MS) being operable for receiving the message, analyzing other messages in the multicast and broadcast service zone according to the DIUC-relevant information contained in the message, and receiving MBS service data according to the analyzing result of other messages in the multicast and broadcast service zone;

wherein said message which contains relevant information is contained in the multicast and broadcast service zone of a downlink frame;

wherein the message is a MBS downlink channel description (MBS-DCD) message;

wherein an information element (IE) indicating an update of the MBS-DCD message is contained in a MBS-MAP message; and the mobile stations (MS) are arranged for judging whether an updated information element (IE) of the MBS-DCD message carried in a received MBS-MAP message is identical to an information element reserved in a MBS-DCD of this mobile station (MS), if yes, the mobile station (MS) directly receiving other messages of the multicast and broadcast service zone according to a DIUC-relevant information carried in a MBS-MAP message reserved by the mobile station (MS), otherwise, the mobile station (MS) receiving a new MBS-DCD message which is related to the message update information element (IE) carried by the MBS-MAP message.

16. The system according to claim 15, wherein the mobile stations (MS) are arranged for determining a position of the MBS-MAP message and receiving the MBS-DCD message according to the MBS-MAP message.

17. The system according to claim 15, wherein DIUC-relevant information comprises at least one definition and index of the downlink interval usage code (DIUC).

18. A cellular telephone system comprising a plurality of base stations operable to provide modulation and coding mode information used for multicast service macro diversity and a plurality of mobile stations (MS):

said base stations being arranged to send in a downlink frame a message containing relevant information of a downlink interval usage code (DIUC) used by a downlink burst, said mobile stations (MS) being operable for:

receiving a MBS-MAP message carrying an update information element (IE) indicating an update of the message sent in the downlink frame;

judging whether the message update information element (IE) carried in the received MBS-MAP message is identical to a reserved message update information element (IE), if yes, the mobile station (MS) directly receiving other messages of a multicast and broadcast service (MBS) zone according to a reserved DIUC-relevant information, otherwise, the mobile station (MS) receiving the message which is sent in the downlink frame and is related to the message update information element (IE), and analyzing other messages in the multicast and broadcast service zone according to the DIUC-relevant information comprised in this message; and receiving MBS service data according to the analyzing result of other messages in the multicast and broadcast service zone.

19. The system according to claim 18, wherein the message containing relevant information is a downlink channel description (DCD) message.

20. The system according to claim 19, wherein the mobile stations (MS) are further operable to determine the position of a downlink MAP (DL-MAP) message and receive the DCD message according to this DL-MAP message.

21. The system according to claim 18, wherein the DIUC-relevant information includes at least one definition and index of the downlink interval usage code (DIUC).

22. A system for receiving MBS service data, comprising: a mobile station (MS) operative to:

receive in a multicast and broadcast service (MBS) zone of a received downlink frame a message from a base station which defines relevant information of modulation and coding mode(s) indicated by a downlink interval usage code (DIUC) and used in the multicast and broadcast service (MBS) zone;

analyze other messages in the multicast and broadcast service zone according to the DIUC-relevant information contained in the received message; and receive the MBS service data according to the analyzing result of said other messages in the multicast and broadcast service zone;

receive a MBS downlink channel description (MBS-DCD) message constituting said message containing relevant information;

receive an information element (IE), in a MBS-MAP message included in the downlink frame, indicating an update of the MBS-DCD message; and judge whether an updated information element (IE) of the MBS-DCD message carried in the received MBS-MAP message is identical to an information element reserved in the MBS-DCD of the mobile station (MS), if yes, the mobile station (MS) being operative to directly receive other messages of the multicast and broadcast service zone according to a DIUC-relevant information carried in a MBS-MAP message reserved by the mobile station (MS), otherwise, the mobile station (MS) being operative to receive a new MBS-DCD message which is related to the message update information element (IE) information carried by the MBS-MAP message.

23. The system according to claim 22, wherein the mobile station (MS) is operative to: determine a position of the MBS-MAP message in the downlink frame; and receive, in the multicast and broadcast service zone of the downlink frame, the MBS-DCD message according to the MBS-MAP message.

24. The system according to claim 22, wherein the mobile station (MS) is operative to receive DIUC-relevant information which comprises at least one definition and index of the downlink interval usage code (DIUC).

25. A system for receiving MBS service data, comprising: a mobile station (MS) operative to:

receive, in a downlink frame, a message from a base station, the message containing relevant information of a downlink interval usage code (DIUC) used by a downlink burst;

receive an information element (IE), which is provided in a MBS-MAP message, that indicates updating of said message sent from a base station containing relevant information of a downlink interval usage code (DIUC) used by a downlink burst and; and judge whether a message update information element (IE) carried in a received MBS-MAP message is identical to a reserved message update information element (IE), if yes, the mobile station (MS) being operative to directly receive other messages of a multicast and broadcast service (MBS) zone according to a reserved DIUC-relevant information, otherwise, the mobile station (MS) being operative to receive the message containing relevant information of a downlink interval usage code (DIUC) and related to the message update information element (IE) carried by the MBS-MAP message, and to analyze the other messages in the multicast and broadcast service zone according to the DIUC-relevant information comprised in the message containing relevant information of a downlink interval usage code (DIUC) and to receive MBS service data according to the analyzing result of the other messages in the multicast and broadcast service zone.

26. The system according to claim 25, wherein the mobile station (MS) is operative to receive said message containing DIUC-relevant information constituted by a downlink channel description (DCD) message.

27. The system according to claim 26, wherein the mobile station (MS) is operative to determine a position of a downlink MAP (DL-MAP) message and receive the DCD message according to this DL-MAP message.

28. The system according to claim 25, wherein the mobile station (MS) is operative to receive DIUC-relevant information which comprises at least one definition and index of the downlink interval usage code (DIUC).

* * * * *